United States Patent
Chen (10) Patent No.: US 8,436,675 B2
(45) Date of Patent: *May 7, 2013

(54) FEEDBACK-CONTROLLED BODY-BIAS VOLTAGE SOURCE

(76) Inventor: Tien-Min Chen, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/685,452

(22) Filed: Jan. 11, 2010

(65) Prior Publication Data

US 2010/0109758 A1 May 6, 2010

Related U.S. Application Data

(63) Continuation of application No. 10/747,016, filed on Dec. 23, 2003, now Pat. No. 7,649,402.

(51) Int. Cl.
*G05F 1/10* (2006.01)

(52) U.S. Cl.
USPC .......................... 327/536; 327/537

(58) Field of Classification Search ................... 327/536; 363/59, 60
See application file for complete search history.

(56) References Cited

U.S. PATENT DOCUMENTS

| | | | |
|---|---|---|---|
| 4,246,517 A | 1/1981 | Dakroub | |
| 4,335,445 A | 6/1982 | Nercessian | |
| 4,471,290 A | 9/1984 | Yamaguchi | |
| 4,679,130 A | 7/1987 | Moscovici | |
| 4,739,252 A | 4/1988 | Malaviya et al. | |
| 4,769,784 A | 9/1988 | Doluca et al. | |
| 4,798,974 A | 1/1989 | Reczek et al. | |
| 4,893,228 A | 1/1990 | Orrick et al. | |
| 4,912,347 A | 3/1990 | Morris | |
| 4,929,621 A | 5/1990 | Manoury et al. | |
| 5,029,282 A * | 7/1991 | Ito ................................. 327/536 |
| 5,039,877 A | 8/1991 | Chern | |
| 5,086,501 A | 2/1992 | DeLuca et al. | |
| 5,103,110 A | 4/1992 | Housworth et al. | |
| 5,113,088 A | 5/1992 | Yamamoto et al. | |

(Continued)

FOREIGN PATENT DOCUMENTS

| EP | 0381021 A2 | 8/1990 |
|---|---|---|
| EP | 0501655 | 2/1992 |

(Continued)

OTHER PUBLICATIONS

Oner, H. et al., "A compact monitoring circuit for real-time on-chip diagnosis of hot-carrier induced degradation", Microelectronic Test Structures, 1997. ICMTS 1997. Proceedings, IEEE International Conference on Monterey, CA, Mar. 17, 1997-Mar. 20, 1997, pp. 72-76.

(Continued)

*Primary Examiner* — Thomas J Hiltunen (57) ABSTRACT

A body-bias voltage source having an output monitor, charge pump, and shunt. a shunt circuit having on/off control is coupled to the output monitor and to the output of the charge pump. Upon sensing that the output voltage of the charge pump is above a desired value, the output monitor may disable the charge pump circuit and may enable the shunt circuit to reduce the voltage at the output of the charge pump. When the voltage output of the charge pump is below the desired value, the output monitor may disable the shunt circuit and may enable the charge pump circuit. A shunt circuit having proportional control may be substituted for the shunt circuit with on/off control.

21 Claims, 5 Drawing Sheets

U.S. PATENT DOCUMENTS

| | | | |
|---|---|---|---|
| 5,124,632 A | 6/1992 | Greaves | |
| 5,167,024 A | 11/1992 | Smith et al. | |
| 5,201,059 A | 4/1993 | Nguyen | |
| 5,204,863 A | 4/1993 | Saint-Joigny et al. | |
| 5,218,704 A | 6/1993 | Watts, Jr. et al. | |
| 5,230,055 A | 7/1993 | Katz et al. | |
| 5,239,652 A | 8/1993 | Seibert et al. | |
| 5,254,883 A | 10/1993 | Horowitz et al. | |
| 5,336,986 A | 8/1994 | Allman | |
| 5,347,172 A | 9/1994 | Cordoba et al. | |
| 5,386,135 A | 1/1995 | Nakazato et al. | |
| 5,394,026 A | 2/1995 | Yu et al. | |
| 5,406,212 A | 4/1995 | Hashinaga et al. | |
| 5,410,278 A | 4/1995 | Itoh et al. | |
| 5,422,591 A | 6/1995 | Rastegar et al. | |
| 5,422,806 A | 6/1995 | Chen et al. | |
| 5,440,520 A | 8/1995 | Schutz et al. | |
| 5,447,876 A | 9/1995 | Moyer et al. | |
| 5,453,953 A * | 9/1995 | Dhong et al. | 365/189.09 |
| 5,461,266 A | 10/1995 | Koreeda et al. | |
| 5,483,434 A | 1/1996 | Seesink | |
| 5,495,184 A | 2/1996 | Des Rosiers et al. | |
| 5,502,838 A | 3/1996 | Kikinis | |
| 5,506,541 A | 4/1996 | Herndon | |
| 5,511,203 A | 4/1996 | Wisor et al. | |
| 5,513,152 A | 4/1996 | Cabaniss | |
| 5,519,309 A | 5/1996 | Smith | |
| 5,560,020 A | 9/1996 | Nakatani et al. | |
| 5,568,103 A | 10/1996 | Nakashima et al. | |
| 5,592,173 A | 1/1997 | Lau et al. | |
| 5,594,360 A | 1/1997 | Wojciechowski | |
| 5,610,533 A | 3/1997 | Arimoto et al. | |
| 5,642,072 A * | 6/1997 | Miyamoto et al. | 327/535 |
| 5,680,359 A | 10/1997 | Jeong | |
| 5,682,093 A | 10/1997 | Kivela | |
| 5,692,204 A | 11/1997 | Rawson et al. | |
| 5,694,072 A | 12/1997 | Hsiao et al. | |
| 5,717,319 A | 2/1998 | Jokinen | |
| 5,719,800 A | 2/1998 | Mittal et al. | |
| 5,727,208 A | 3/1998 | Brown | |
| 5,744,996 A * | 4/1998 | Kotzle et al. | 327/534 |
| 5,745,375 A | 4/1998 | Reinhardt et al. | |
| 5,752,011 A | 5/1998 | Thomas et al. | |
| 5,754,869 A | 5/1998 | Holzhammer et al. | |
| 5,757,171 A | 5/1998 | Babcock | |
| 5,764,110 A | 6/1998 | Ishibashi | |
| 5,778,237 A | 7/1998 | Yamamoto et al. | |
| 5,781,060 A | 7/1998 | Sugawara | |
| 5,796,313 A | 8/1998 | Eitan | |
| 5,812,860 A | 9/1998 | Horden et al. | |
| 5,815,724 A | 9/1998 | Mates | |
| 5,815,725 A | 9/1998 | Feierbach | |
| 5,818,290 A * | 10/1998 | Tsukada | 327/537 |
| 5,821,808 A * | 10/1998 | Fujima | 327/541 |
| 5,825,674 A | 10/1998 | Jackson | |
| 5,838,189 A | 11/1998 | Jeon | |
| 5,842,860 A | 12/1998 | Funt | |
| 5,848,281 A | 12/1998 | Smalley et al. | |
| 5,859,797 A * | 1/1999 | Maccarrone et al. | 365/185.25 |
| 5,864,227 A * | 1/1999 | Borden et al. | 323/280 |
| 5,880,620 A | 3/1999 | Gitlin et al. | |
| 5,884,049 A | 3/1999 | Atkinson | |
| 5,894,577 A | 4/1999 | MacDonald et al. | |
| 5,900,773 A | 5/1999 | Susak | |
| 5,920,226 A * | 7/1999 | Mimura | 327/537 |
| 5,923,545 A | 7/1999 | Nguyen | |
| 5,929,621 A | 7/1999 | Angelici et al. | |
| 5,933,649 A | 8/1999 | Lim et al. | |
| 5,940,020 A | 8/1999 | Ho | |
| 5,940,283 A | 8/1999 | Mihara et al. | |
| 5,940,785 A | 8/1999 | Georgiou et al. | |
| 5,940,786 A | 8/1999 | Steeby | |
| 5,952,871 A | 9/1999 | Jeon | |
| 5,973,526 A | 10/1999 | Dabral | |
| 5,974,557 A | 10/1999 | Thomas et al. | |
| 5,977,763 A | 11/1999 | Loughmiller et al. | |
| 5,986,947 A | 11/1999 | Choi et al. | |
| 5,996,083 A | 11/1999 | Gupta et al. | |
| 5,996,084 A | 11/1999 | Watts | |
| 5,999,040 A | 12/1999 | Do et al. | |
| 6,006,169 A | 12/1999 | Sandhu et al. | |
| 6,009,022 A * | 12/1999 | Lee et al. | 365/189.09 |
| 6,011,403 A | 1/2000 | Gillette | |
| 6,018,264 A | 1/2000 | Jin | |
| 6,021,500 A | 2/2000 | Wang et al. | |
| 6,035,407 A | 3/2000 | Gebara et al. | |
| 6,047,248 A | 4/2000 | Georgiou et al. | |
| 6,048,746 A | 4/2000 | Burr | |
| 6,055,655 A | 4/2000 | Momohara | |
| 6,075,404 A | 6/2000 | Shindoh et al. | |
| 6,078,084 A | 6/2000 | Nakamura et al. | |
| 6,078,319 A | 6/2000 | Bril et al. | |
| 6,087,820 A | 7/2000 | Houghton et al. | |
| 6,087,892 A | 7/2000 | Burr | |
| 6,091,283 A | 7/2000 | Murgula et al. | |
| 6,091,300 A | 7/2000 | Setty et al. | |
| 6,097,113 A * | 8/2000 | Teraoka et al. | 307/125 |
| 6,097,242 A | 8/2000 | Forbes et al. | |
| 6,100,751 A | 8/2000 | De et al. | |
| 6,118,306 A | 9/2000 | Orton et al. | |
| 6,119,241 A | 9/2000 | Michail et al. | |
| 6,141,762 A | 10/2000 | Nicol et al. | |
| 6,157,092 A | 12/2000 | Hofmann | |
| 6,172,943 B1 | 1/2001 | Yuzuki | |
| 6,201,375 B1 * | 3/2001 | Larson et al. | 323/277 |
| 6,202,104 B1 | 3/2001 | Ober | |
| 6,216,235 B1 | 4/2001 | Thomas et al. | |
| 6,218,708 B1 | 4/2001 | Burr | |
| 6,218,892 B1 | 4/2001 | Soumyanath et al. | |
| 6,218,895 B1 | 4/2001 | De et al. | |
| 6,226,335 B1 | 5/2001 | Prozorov | |
| 6,229,379 B1 | 5/2001 | Okamoto | |
| 6,229,747 B1 | 5/2001 | Cho et al. | |
| 6,232,793 B1 | 5/2001 | Arimoto et al. | |
| 6,232,827 B1 | 5/2001 | De et al. | |
| 6,232,830 B1 | 5/2001 | Fournel | |
| 6,242,936 B1 | 6/2001 | Ho et al. | |
| 6,249,455 B1 * | 6/2001 | Kim | 365/185.19 |
| 6,259,612 B1 | 7/2001 | Itoh | |
| 6,272,642 B2 | 8/2001 | Pole, II et al. | |
| 6,279,048 B1 | 8/2001 | Fadavi-Ardekani et al. | |
| 6,281,716 B1 | 8/2001 | Mihara | |
| 6,303,444 B1 * | 10/2001 | Burr | 438/289 |
| 6,304,824 B1 | 10/2001 | Bausch et al. | |
| 6,305,407 B1 | 10/2001 | Selby | |
| 6,311,287 B1 | 10/2001 | Dischler et al. | |
| 6,314,522 B1 | 11/2001 | Chu et al. | |
| 6,320,453 B1 * | 11/2001 | Manning | 327/534 |
| 6,337,593 B1 | 1/2002 | Mizuno et al. | |
| 6,341,087 B1 | 1/2002 | Kunikiyo | |
| 6,345,362 B1 | 2/2002 | Bertin et al. | |
| 6,345,363 B1 | 2/2002 | Levy-Kendler | |
| 6,347,379 B1 | 2/2002 | Dai et al. | |
| 6,370,046 B1 | 4/2002 | Nebrigic et al. | |
| 6,373,323 B2 | 4/2002 | Kuroda | |
| 6,373,325 B1 | 4/2002 | Kuriyama | |
| 6,378,081 B1 | 4/2002 | Hammond | |
| 6,388,302 B1 * | 5/2002 | Galli | 257/498 |
| 6,388,432 B2 | 5/2002 | Uchida | |
| 6,392,467 B1 | 5/2002 | Oowaki et al. | |
| 6,396,312 B1 | 5/2002 | Shepston et al. | |
| 6,407,571 B1 | 6/2002 | Furuya et al. | |
| 6,411,156 B1 | 6/2002 | Borkar et al. | |
| 6,415,388 B1 | 7/2002 | Browning et al. | |
| 6,422,746 B1 | 7/2002 | Weiss et al. | |
| 6,424,203 B1 | 7/2002 | Bayadroun | |
| 6,424,217 B1 | 7/2002 | Kwong | |
| 6,425,086 B1 | 7/2002 | Clark et al. | |
| 6,426,641 B1 | 7/2002 | Koch et al. | |
| 6,427,211 B2 | 7/2002 | Watts, Jr. | |
| 6,442,746 B1 | 8/2002 | James et al. | |
| 6,456,157 B1 | 9/2002 | Forbes et al. | |
| 6,457,134 B1 | 9/2002 | Lemke et al. | |
| 6,457,135 B1 | 9/2002 | Cooper | |

| | | |
|---|---|---|
| 6,466,077 B1 | 10/2002 | Miyazaki et al. |
| 6,469,573 B2 | 10/2002 | Kanda et al. |
| 6,476,632 B1 | 11/2002 | La Rosa et al. |
| 6,477,654 B1 | 11/2002 | Dean et al. |
| 6,484,265 B2 | 11/2002 | Borkar et al. |
| 6,486,729 B2 | 11/2002 | Imamiya |
| 6,487,668 B2 | 11/2002 | Thomas et al. |
| 6,489,224 B1 | 12/2002 | Burr |
| 6,489,796 B2 | 12/2002 | Tomishima |
| 6,496,027 B1 | 12/2002 | Sher et al. |
| 6,496,057 B2 | 12/2002 | Wada et al. |
| 6,507,235 B1 * | 1/2003 | Sher ............................ 327/534 |
| 6,510,400 B1 | 1/2003 | Moriyama |
| 6,510,525 B1 | 1/2003 | Nookala et al. |
| 6,513,124 B1 | 1/2003 | Furuichi et al. |
| 6,518,826 B2 | 2/2003 | Zhang |
| 6,518,828 B2 | 2/2003 | Seo et al. |
| 6,519,706 B1 | 2/2003 | Ogoro |
| 6,529,421 B1 * | 3/2003 | Marr et al. ................ 365/189.09 |
| 6,531,912 B2 | 3/2003 | Katou |
| 6,563,371 B2 | 5/2003 | Buckley, III et al. |
| 6,570,371 B1 | 5/2003 | Volk |
| 6,574,577 B2 | 6/2003 | Stapleton et al. |
| 6,574,739 B1 | 6/2003 | Kung et al. |
| 6,577,514 B2 * | 6/2003 | Shor et al. ...................... 363/59 |
| 6,600,346 B1 | 7/2003 | Macaluso |
| 6,614,301 B2 | 9/2003 | Casper et al. |
| 6,617,656 B2 | 9/2003 | Lee et al. |
| 6,621,325 B2 | 9/2003 | Hart et al. |
| 6,642,774 B1 | 11/2003 | Li |
| 6,653,890 B2 | 11/2003 | Ono et al. |
| 6,657,504 B1 | 12/2003 | Deal et al. |
| 6,675,360 B1 | 1/2004 | Cantone et al. |
| 6,677,643 B2 | 1/2004 | Iwamoto et al. |
| 6,700,434 B2 | 3/2004 | Fujii et al. |
| 6,731,157 B2 | 5/2004 | Fulkerson |
| 6,731,221 B1 | 5/2004 | Dioshongh et al. |
| 6,737,909 B2 | 5/2004 | Jaussi et al. |
| 6,741,118 B2 * | 5/2004 | Uchikoba et al. ............. 327/541 |
| 6,771,115 B2 | 8/2004 | Nakano |
| 6,774,705 B2 | 8/2004 | Miyazaki et al. |
| 6,777,978 B2 | 8/2004 | Hart et al. |
| 6,784,722 B2 | 8/2004 | Tang et al. |
| 6,791,146 B2 | 9/2004 | Lai et al. |
| 6,791,157 B1 | 9/2004 | Casto et al. |
| 6,791,212 B2 | 9/2004 | Pulvirenti et al. |
| 6,792,379 B2 | 9/2004 | Ando |
| 6,794,630 B2 | 9/2004 | Keshavarzi et al. |
| 6,803,633 B2 | 10/2004 | Mergens et al. |
| 6,809,968 B2 | 10/2004 | Marr et al. |
| 6,812,758 B2 | 11/2004 | Gauthier et al. |
| 6,815,971 B2 | 11/2004 | Wang et al. |
| 6,847,252 B1 | 1/2005 | Ono et al. |
| 6,856,120 B2 * | 2/2005 | Miyazaki ....................... 323/211 |
| 6,858,897 B2 | 2/2005 | Chen |
| 6,865,116 B2 | 3/2005 | Kim et al. |
| 6,882,172 B1 | 4/2005 | Suzuki et al. |
| 6,885,210 B1 | 4/2005 | Suzuki |
| 6,889,331 B2 | 5/2005 | Soerensen et al. |
| 6,906,582 B2 | 6/2005 | Kase et al. |
| 6,912,155 B2 | 6/2005 | Sakurai et al. |
| 6,914,474 B2 * | 7/2005 | Yamahira ....................... 327/535 |
| 6,917,240 B2 | 7/2005 | Trafton et al. |
| 6,922,783 B2 | 7/2005 | Knee et al. |
| 6,927,620 B2 | 8/2005 | Senda |
| 6,936,898 B2 | 8/2005 | Pelham et al. |
| 6,967,522 B2 | 11/2005 | Chandrakasan et al. |
| 6,986,068 B2 | 1/2006 | Togawa |
| 6,992,508 B2 | 1/2006 | Chow |
| 7,012,461 B1 | 3/2006 | Chen et al. |
| 7,030,681 B2 | 4/2006 | Yamazaki et al. |
| 7,096,145 B2 | 8/2006 | Orenstien et al. |
| 7,100,061 B2 | 8/2006 | Halepete et al. |
| 7,112,978 B1 | 9/2006 | Koniaris et al. |
| 7,119,604 B2 | 10/2006 | Chih |
| 7,120,804 B2 | 10/2006 | Tschanz et al. |
| 7,129,745 B2 | 10/2006 | Lewis et al. |
| 7,129,771 B1 | 10/2006 | Chen |
| 7,180,322 B1 | 2/2007 | Koniaris et al. |
| 7,188,261 B1 | 3/2007 | Tobias et al. |
| 7,228,242 B2 | 6/2007 | Read et al. |
| 7,263,457 B2 | 8/2007 | White et al. |
| 7,334,198 B2 | 2/2008 | Ditzel et al. |
| 7,336,090 B1 | 2/2008 | Koniaris et al. |
| 7,336,092 B1 | 2/2008 | Koniaris et al. |
| 7,348,827 B2 | 3/2008 | Rahim et al. |
| 7,362,165 B1 | 4/2008 | Chen |
| 7,363,176 B2 | 4/2008 | Patel et al. |
| 7,502,565 B2 | 3/2009 | Moran |
| 7,562,233 B1 | 7/2009 | Sheng et al. |
| 7,626,409 B1 | 12/2009 | Koniaris et al. |
| 7,649,402 B1 * | 1/2010 | Chen ............................ 327/536 |
| 7,671,621 B2 | 3/2010 | Koniaris et al. |
| 7,692,477 B1 * | 4/2010 | Chen ............................ 327/534 |
| 7,774,625 B1 | 8/2010 | Sheng et al. |
| 7,815,725 B2 | 10/2010 | Reinke et al. |
| 7,941,675 B2 | 5/2011 | Burr et al. |
| 7,953,990 B2 | 5/2011 | Stewart et al. |
| 2001/0028577 A1 | 10/2001 | Sung et al. |
| 2002/0002689 A1 | 1/2002 | Yeh |
| 2002/0011650 A1 | 1/2002 | Nishizawa et al. |
| 2002/0026597 A1 | 2/2002 | Dai et al. |
| 2002/0029352 A1 | 3/2002 | Borkar et al. |
| 2002/0032829 A1 | 3/2002 | Dalrymple |
| 2002/0067638 A1 | 6/2002 | Kobayashi et al. |
| 2002/0073348 A1 | 6/2002 | Tani |
| 2002/0083356 A1 | 6/2002 | Dai |
| 2002/0087219 A1 | 7/2002 | Dai |
| 2002/0087896 A1 | 7/2002 | Cline et al. |
| 2002/0113628 A1 | 8/2002 | Ajit |
| 2002/0116650 A1 | 8/2002 | Halepete et al. |
| 2002/0130701 A1 | 9/2002 | Kleveland |
| 2002/0138778 A1 | 9/2002 | Cole et al. |
| 2002/0140494 A1 | 10/2002 | Thomas et al. |
| 2002/0178390 A1 | 11/2002 | Lee |
| 2002/0194509 A1 | 12/2002 | Plante et al. |
| 2003/0006590 A1 | 1/2003 | Aoki et al. |
| 2003/0036876 A1 | 2/2003 | Fuller, III et al. |
| 2003/0041403 A1 | 3/2003 | Chang |
| 2003/0065960 A1 | 4/2003 | Rusu et al. |
| 2003/0071657 A1 | 4/2003 | Soerensen et al. |
| 2003/0074591 A1 | 4/2003 | McClendon et al. |
| 2003/0098736 A1 | 5/2003 | Uchikoba et al. |
| 2003/0122610 A1 * | 7/2003 | Zeng et al. .................... 327/536 |
| 2003/0189465 A1 | 10/2003 | Abadeer et al. |
| 2004/0025061 A1 | 2/2004 | Lawrence |
| 2004/0073821 A1 | 4/2004 | Naveh et al. |
| 2004/0103330 A1 | 5/2004 | Bonnett |
| 2004/0108881 A1 | 6/2004 | Bokui et al. |
| 2004/0123170 A1 | 6/2004 | Tschanz et al. |
| 2004/0128631 A1 | 7/2004 | Ditzel et al. |
| 2004/0246044 A1 | 12/2004 | Myono et al. |
| 2005/0225376 A1 | 10/2005 | Kin Law |
| 2005/0231265 A1 * | 10/2005 | Yamahira ....................... 327/535 |
| 2006/0074576 A1 | 4/2006 | Patel et al. |
| 2007/0229054 A1 | 10/2007 | Dobberpuhl et al. |
| 2007/0283176 A1 | 12/2007 | Tobias et al. |
| 2007/0296440 A1 | 12/2007 | Takamiya et al. |
| 2008/0143372 A1 | 6/2008 | Koniaris et al. |
| 2010/0077233 A1 | 3/2010 | Koniaris et al. |
| 2010/0097092 A1 | 4/2010 | Koniaris et al. |

FOREIGN PATENT DOCUMENTS

| | | |
|---|---|---|
| EP | 0474963 | 3/1992 |
| EP | 0504655 | 9/1992 |
| EP | 0624909 A2 | 11/1994 |
| EP | 0978781 | 4/2003 |
| EP | 1398639 | 3/2004 |
| JP | 63233480 | 9/1988 |
| JP | 04114365 | 4/1992 |
| JP | 9185589 | 7/1997 |
| JP | 11118845 | 4/1999 |
| JP | 2000172383 | 6/2000 |
| JP | 2001345693 | 12/2001 |
| JP | 2003324735 | 11/2003 |
| WO | 0127728 | 4/2001 |
| WO | 0238828 | 5/2002 |
| WO | 2004061634 | 7/2004 |

OTHER PUBLICATIONS

"Computer Software", Wikipedia, http://en.wikipedia.org/wiki/software, retrieved May 2, 2007.
"Wafer Burn-In Isolation Circuit", IBM Technical Disclosure Bulletin, IBM Corp., New York, US, vol. 32, No. 6B, Nov. 1, 1989, pp. 442-443, XP00073858 ISSN:0018-8689 the whole document.
"High Speed Digitally Adjusted Step-Down Controllers for Notebook CPUS"; Max1710/Max1711; MAXIM Manual; p. 11 and p. 21.
"Operation U (Refer to Functional Diagram)"; LTC 1736;, Linear Technology Manual; p. 9.
Baker K. et al., "SHMOO Plotting: The Black Art of IC Testing", IEEE Design and Test of Computers, IEEE vol, 14, No. 3, Jul. 1, 1997, pp. 90-97, XP000793305 ISSN: 0740-7475 the whole document.
Desai et al., "Sizing of Clock Distribution Networks for High Performance CPU Chips", Digital Equipment Corporation, Hudson, MA, pp. 389-394, 1996.
Final Office Action Mailed Jan. 12, 2009; U.S. Appl. No. 10/746,539.
Non-Final Office Action Mailed Jun. 24, 2004; Patent No. 7228242.
Notice of Allowance Mailed Jan. 5, 2005; Patent No. 7228242.
Notice of Allowance Mailed Jul. 6, 2005; Patent No. 7228242.
Notice of Allowance Mailed Sep. 22, 2005; Patent No. 7228242.
Notice of Allowance Mailed Aug. 10, 2006; Patent No. 7228242.
Issue Notification Mailed May 16, 2007; Patent No. 7228242.
Non-Final Office Action Mailed Aug. 21, 2007; U.S. Appl. No. 10/951,835.
Restriction Requirement Mailed Mar. 19, 2007; U.S. Appl. No. 10/951,835.
Restriction Requirement Mailed May 28, 2009; U.S. Appl. No. 11/810,516.
Non-Final Office Action Mailed Dec. 23, 2004; Patent No. 7129771.
Final Office Action Mailed Apr. 13, 2005; Patent No. 7129771.
Non-Final Office Action Mailed Jul. 29, 2005; Patent No. 7129771.
Final Office Action Mailed Dec. 2, 2005; Patent No. 7129771.
Non-Final Office Action Mailed Apr. 18, 2006; Patent No. 7129771.
Notice of Allowance Mailed Jun. 21, 2006; Patent No. 7129771.
Non-Final Office Action Mailed Aug. 1, 2007; U.S. Appl. No. 11/591,431.
Notice of Allowance Mailed Nov. 23, 2007; U.S. Appl. No. 11/591,431.
Notice of Allowance Mailed Dec. 13, 2007; U.S. Appl. No. 11/591,431.
Issue Notification Mailed Apr. 2, 2008; U.S. Appl. No. 11/591,431.
Non-Final Office Action Mailed Sep. 26, 2008; U.S. Appl. No. 12/107,733.
Final Office Action Mailed Mar. 9, 2009; U.S. Appl. No. 12/107,733.
Non-Final Office Action Mailed May 21, 2009; U.S. Appl. No. 12/107,733.
Non-Final Office Action Mailed Sep. 6, 2006; U.S. Appl. No. 10/874,772.
Final Office Action Mailed Feb. 28, 2007; U.S. Appl. No. 10/874,772.
Non-Final Office Action Mailed Jun. 20, 2007; U.S. Appl. No. 10/874,772.
Notice of Allowance Mailed Nov. 20, 2007; U.S. Appl. No. 10/874,772.
Notice of Allowance Mailed Apr. 2, 2008; U.S. Appl. No. 10/874,772.
Non-Final Office Action Mailed Aug. 9, 2006; U.S. Appl. No. 10/874,407.
Notice of Allowance Mailed Oct. 1, 2008; U.S. Appl. No. 10/874,407.
Non-Final Office Action Mailed Feb. 3, 2009; U.S. Appl. No. 10/874,407.
Non-Final Office Action Mailed Dec. 10, 2004; U.S. Appl. No. 10/746,539.
Final Office Action Mailed Apr. 11, 2005; U.S. Appl. No. 10/746,539.
Non-Final Office Action Mailed Aug. 11, 2005; U.S. Appl. No. 10/746,539.
Final Office Action Mailed Dec. 19, 2005; U.S. Appl. No. 10/746,539.
Non-Final Office Action Mailed Apr. 11, 2006; U.S. Appl. No. 10/746,539.
Final Office Action Mailed Aug. 31, 2006; U.S. Appl. No. 10/746,539.
Non-Final Office Action Mailed Jan. 23, 2007; U.S. Appl. No. 10/746,539.
Final Office Action Mailed Jun. 15, 2007; U.S. Appl. No. 10/746,539.
Non-Final Office Action Mailed Nov. 30, 2007; U.S. Appl. No. 10/746,539.
Final Office Action Mailed Apr. 2, 2008; U.S. Appl. No. 10/746,539.
Non-Final Office Action Mailed Aug. 25, 2008; U.S. Appl. No. 10/746,539.
Non-Final Office Action Mailed Jun. 2, 2009; U.S. Appl. No. 10/746,539.
Non-Final Office Action Mailed Apr. 4, 2007; U.S. Appl. No. 11/358,482.
Final Office Action Mailed Aug. 23, 2007; U.S. Appl. No. 11/358,482.
Non-Final Office Action Mailed Dec. 26, 2007; U.S. Appl. No. 11/358,482.
Final Office Action Mailed May 23, 2008; U.S. Appl. No. 11/358,482.
Non-Final Office Action Mailed Oct. 14, 2008; U.S. Appl. No. 11/358,482.
Final Office Action Mailed Feb. 23, 2009; U.S. Appl. No. 11/358,482.
Non-Final Office Action Mailed Dec. 22, 2004; U.S. Appl. No. 10/747,022.
Notice of Allowance Mailed Sep. 28, 2005; U.S. Appl. No. 10/747,022.
Non-Final Office Action Mailed Jun. 13, 2005; U.S. Appl. No. 10/334,919.
Final Office Action Mailed Mar. 9, 2006; U.S. Appl. No. 10/334,919.
Non-Final Office Action Mailed Aug. 7, 2006; U.S. Appl. No. 10/334,919.
Final Office Action Mailed Feb. 21, 2007; U.S. Appl. No. 10/334,919.
Non-Final Office Action Mailed May 15, 2007; U.S. Appl. No. 10/334,919.
Non-Final Office Action Mailed Nov. 23, 2007; U.S. Appl. No. 10/334,919.
Non-Final Office Action Mailed Jan. 6, 2009; U.S. Appl. No. 10/334,919.
Non-Final Office Action Mailed May 28, 2009; U.S. Appl. No. 10/334,919.
Notice of Allowance Dated Jul. 13, 2009; U.S. Appl. No. 10/874,407.
Non Final Office Action Dated Jul. 23, 2009; U.S. Appl. No. 11/358,482.
R. Jacob Baker, Hary W. Li, DAvid E. Boyce; CMOS Circuit Design, Layout Simulation; IEEE Press; 1998.
Hsu, Jui Ching, "Fabrication of Single Walled Carbon Nanotube (SW-CNT) Cantilevers for Chemical Sensing", M. Sc Thesis, Louisiana State University, Dec. 2007.
Merriam-webster's Collegiate Dictionary, tenth edition, pp. 252 and 603 (Merriam-Webster Inc., Springfield, Mass, USA).
Final Office Action; Mail Date Jan. 12, 2009; U.S. Appl. No. 10/746,539.
Non-Final Office Action Mailed Jun. 6, 2011; U.S. Appl. No. 11/810,516.
Final Office Action Mailed May 4, 2011; U.S. Appl. No. 12/709,421.
Notice of Allowance Mailed Jul. 11, 2011; U.S. Appl. No. 12/709,421.
Notice of Restriction Mailed May 12, 2011; U.S. Appl. No. 12/502,902.
Advisory Action; Mail Date May 7, 2007; U.S. Appl. No. 10/334,918.
Final Office Action; Mail Date Jan. 31, 2007; U.S. Appl. No. 10/334,918.
Final Office Action; Mail Date Feb. 15, 2006; U.S. Appl. No. 10/334,918.
Final Office Action; Mail Date Jul. 19, 2010; U.S. Appl. No. 10/334,918.
Final Office Action; Mail Date Aug. 4, 2009; U.S. Appl. No. 10/334,918.
Final Office Action; Mail Date Oct. 30, 2006; U.S. Appl. No. 10/334,918.

Final Office Action; Mail Date Nov. 26, 2008; U.S. Appl. No. 10/334,918.
Interview Summary; Mail Date Oct. 8, 2009; U.S. Appl. No. 10/334,918.
Non Final Office Action; Mail Date Feb. 18, 2009; U.S. Appl. No. 10/334,918.
Non Final Office Action; Mail Date May 13, 2008; U.S. Appl. No. 10/334,918.
Non Final Office Action; Mail Date May 15, 2006; U.S. Appl. No. 10/334,918.
Non Final Office Action; Mail Date Jun. 13, 2005; U.S. Appl. No. 10/334,918.
Notice of Allowance; Mail Date Jan. 3, 2011; U.S. Appl. No. 10/334,918.
Non Final Office Action; Mail Date Feb. 4, 2010; U.S. Appl. No. 10/334,918.
Final Office Action; Mail Date Jul. 8, 2010; U.S. Appl. No. 10/334,919.
Non Final Office Action; Mail Date Jan. 5, 2010; U.S. Appl. No. 10/334,919.
Notice of Allowance; Mail Date Jan. 20, 2011; U.S. Appl. No. 10/334,919.
Non Final Office Action; Mail Date Aug. 21, 2007; U.S. Appl. No. 10/951,835.
Non Final Office Action; Mail Date Mar. 29, 2010; U.S. Appl. No. 11/810,516.
Final Office Action; Mail Date Mar. 16, 2011; U.S. Appl. No. 11/810,516.
Non Final Office Action; Mail Date Oct. 7, 2010; U.S. Appl. No. 11/810,516.
Advisory Action; Mail Date Jan. 11, 2010; U.S. Appl. No. 12/107,733.
Final Office Action; Mail Date Nov. 12, 2009; U.S. Appl. No. 12/107,733.
Non Final Office Action; Mail Date Feb. 24, 2010; U.S. Appl. No. 12/107,733.
Notice of Allowance; Mail Date Jul. 28, 2010; U.S. Appl. No. 12/107,733.
Final Office Action; Mail Date Apr. 22, 2005; U.S. Appl. No. 10/747,016.
Final Office Action; Mail Date Oct. 30, 2007; U.S. Appl. No. 10/747,016.
Final Office Action; Mail Date Dec. 7, 2006; U.S. Appl. No. 10/747,016.
Non Final Office Action; Mail Date Mar. 20, 2008; U.S. Appl. No. 10/747,016.
Non Final Office Action; Mail Date May 16, 2007; U.S. Appl. No. 10/747,016.
Non Final Office Action; Mail Date Jun. 23, 2006; U.S. Appl. No. 10/747,016.
Non Final Office Action; Mail Date Nov. 18, 2005; U.S. Appl. No. 10/747,016.
Non Final Office Action; Mail Date Dec. 22, 2004; U.S. Appl. No. 10/747,016.
Notice of Allowance; Mail Date Mar. 13, 2009; U.S. Appl. No. 10/747,016.
Notice of Allowance; Mail Date Aug. 20, 2009; U.S. Appl. No. 10/747,016.
Notice of Allowance; Mail Date Aug. 27, 2008; U.S. Appl. No. 10/747,016.
Notice of Allowance; Mail Date Dec. 18, 2008; U.S. Appl. No. 10/747,016.
Non Final Office Action; Mail Date Jun. 2, 2009; U.S. Appl. No. 10/746,539.
Notice of Allowance; Mail Date Nov. 18, 2009; U.S. Appl. No. 10/746,539.
Non Final Office Action; Mail Date Aug. 6, 2010; U.S. Appl. No. 12/709,421.
Non Final Office Action; Mail Date Jul. 23, 2009; U.S. Appl. No. 11/358,482.
Non Final Office Action; Mail Date Nov. 17, 2009; U.S. Appl. No. 10/874,407.
Examiner Interview Summary; Mail Date Feb. 23, 2010; U.S. Appl. No. 10/874,407.
Notice of Allowance; Mail Date: Mar. 24, 2010; U.S. Appl. No. 10/874,407.
Notice of Allowance; U.S. Appl. No. 12/709,421; Mailed Date: Jan. 26, 2012.
Non-Final Office Action; U.S. Appl. No.: 12/502,902; Mailed Date: Nov. 9, 2011.
Non-Final Rejection; U.S. Appl. No.: 11/810,516; Mailed Date: Nov. 15, 2011.
Non-Final Office Action; U.S. Appl. No.: 13/118,762; Mailed Date: Oct. 6, 2011.

* cited by examiner

FEEDBACK-CONTROLLED BODY-BIAS VOLTAGE SOURCE

RELATED UNITED STATES PATENT APPLICATIONS

This application is a Continuation Application of the commonly-owned U.S. patent application with Ser. No. 10/747,016, now U.S. Pat. No. 7,649,402, filed Dec. 23, 2003, by Tien-Min Chen, and entitled "Feedback-Controlled Body-Bias Voltage Source," which is hereby incorporated by reference in its entirety.

This Application is related to U.S. patent application, Ser. No. 10/747,015, now U.S. Pat. No. 7,129,771, by Tien-Min Chen, filed on Dec. 23, 2003, entitled "Servo Loop for Well Bias Voltage Source," and assigned to the assignee of the present invention.

This Application is related to U.S. patent application, Ser. No. 10/746,539, now U.S. Pat. No. 7,692,477, by Tien-Min Chen and Robert Fu, filed on Dec. 23, 2003, entitled "A Precise Control Component for a Substrate Potential Regulation Circuit," and assigned to the assignee of the present invention.

This Application is related to U.S. patent application, Ser. No. 10/747,022, now U.S. Pat. No. 7,012,461, by Tien-Min Chen, filed on Dec. 23, 2003, entitled "A Charge Stabilizing Component for a Substrate Potential Regulation Circuit," and assigned to the assignee of the present invention.

FIELD OF THE INVENTION

Embodiments of the present invention relate to circuits for providing operational voltages in complementary metal-oxide semiconductor (CMOS) circuits. In particular, embodiments of the present invention relate to circuits for providing a body-bias voltage for CMOS transistors.

BACKGROUND ART

As the operating voltages for CMOS transistor circuits have decreased, variations in the threshold voltages for the transistors have become more significant. Although low operating voltages offer the potential for reduced power consumption, threshold voltage variations due to process and environmental variables often prevent optimum efficiency and performance from being achieved due to increased leakage currents.

Figure 1A:
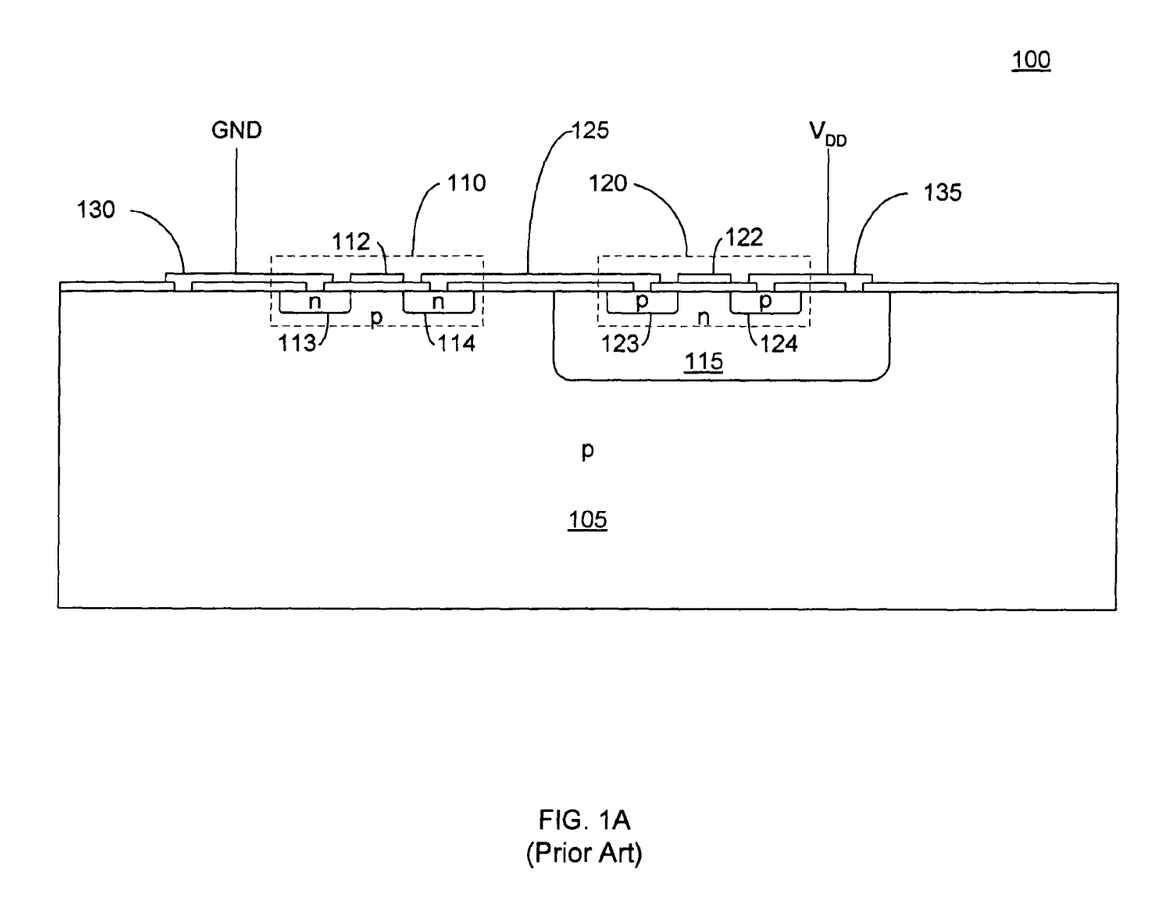
FIG. 1A shows a conventional CMOS inverter without body-bias connections.

Prior Art FIG. 1A shows a conventional CMOS inverter 100. A P-type substrate 105 supports an NFET 110 and a PFET 120. The NFET 110 comprises a gate 112, source 113, and drain 114. The PFET 120 resides in an n-well 115, and comprises a gate 122, drain 123, and a source 124. The substrate 105 and source 113 are coupled by a tie 130 that is connected to ground (GND), while source 124 and N-well 115 are coupled by a tie 135 that is connected to a supply voltage ($V_{DD}$). The input to the inverter is applied to the gates 112 and 122, with the output taken from the drain contact 125. In this conventional configuration, the transistors are often treated as three terminal devices.

Threshold voltage variations may be compensated for by body-biasing. Body-biasing introduces a reverse bias potential between the bulk and the source of the transistor that allows the threshold voltage of the transistor to be adjusted electrically. The purpose of body-biasing is to compensate for 1) process variations; 2) temperature variations; 3) supply voltage variations; 4) changes in frequency of operation; and 5) changing levels of switching activity.

Figure 1B:
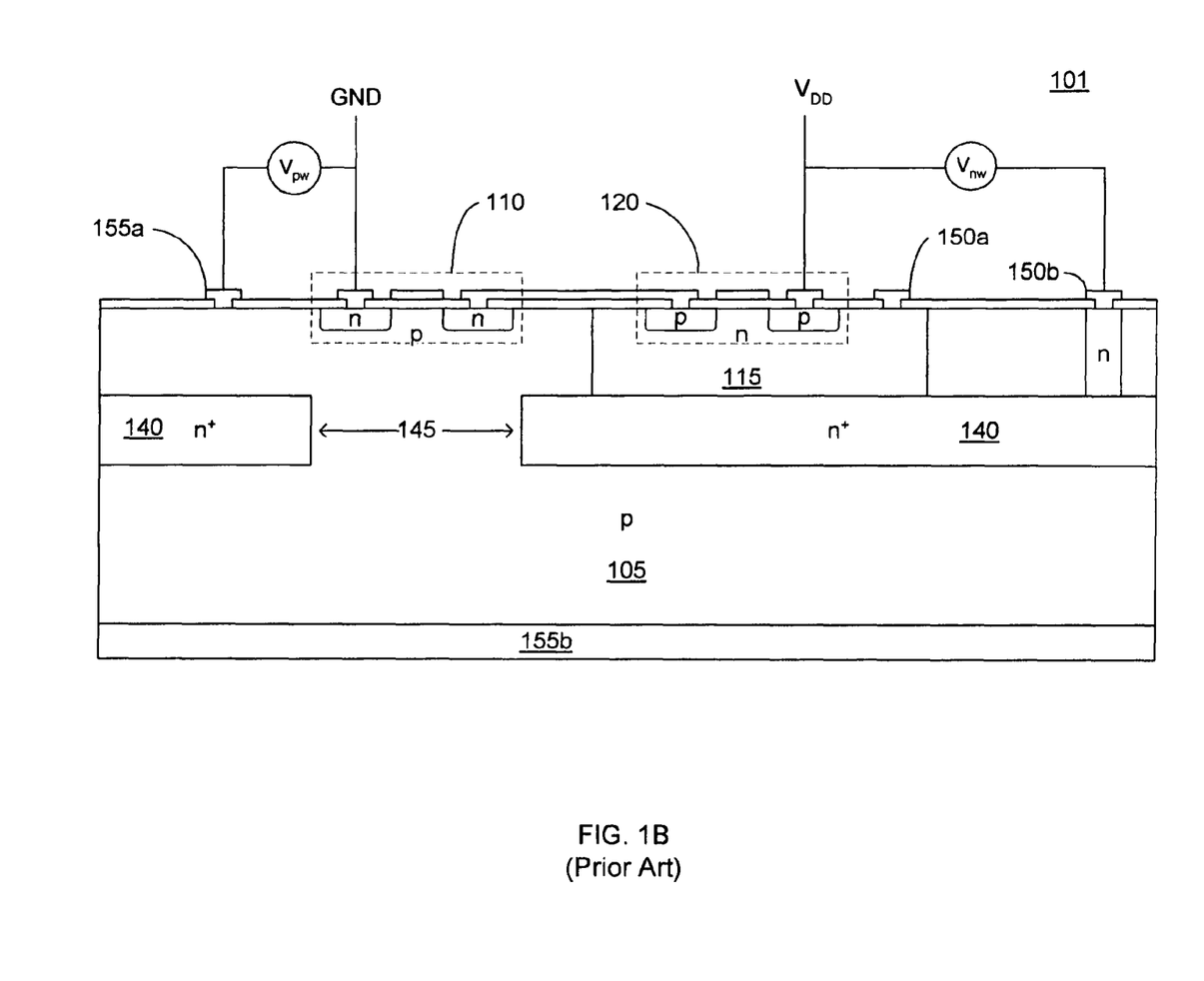
FIG. 1B shows a conventional CMOS inverter with body-bias connections.

Prior Art FIG. 1B shows an inverter having connections for body-biasing. Body-bias can provided to the PFET 120 through a direct bias contact 150a, or by a buried n-well 140 using contact 150b. Similarly, body-bias may be provided to the NFET 110 by a surface contact 155a, or by a backside contact 155b. An aperture 145 may be provided in the buried n-well 125 so that the bias potential reaches the NFET 110. In general, a PFET 120 or an NFET 110 may be biased by one of the alternative contacts shown.

Depending upon the environmental and operational conditions, a CMOS circuit may require different levels of bias for the transistors. For example, a microprocessor that is executing a computationally intensive routine for a real-time application will typically be biased for maximum speed, whereas during periods of low activity the bias will be adjusted to minimize leakage current.

For a CMOS integrated circuit, the load presented to a circuit providing a body-bias voltage and the bias circuit itself may vary with the environmental and operational conditions of integrated circuit. Thus, the variations in the required body-bias voltage and the load to which it is applied should be taken into account to achieve optimum performance.

SUMMARY OF INVENTION

Thus, a need exists for a system for providing a body-bias voltage for CMOS transistors that is capable of adapting to varying output voltage requirements and load conditions.

Accordingly, embodiments of the present invention provide a system that uses feedback controlled charge pump to establishing a desired output voltage. The system accepts an input reference voltage that is related to the desired output voltage in order to provide the desired output voltage.

In an embodiment of the present invention, a charge pump having a voltage output and an enable input for on/off control is coupled to an output monitor (e.g., a sense amplifier). The output monitor is coupled to the output of the charge pump and to the enable input of the charge pump. A shunt circuit having on/off control is coupled to the output monitor and to the output of the charge pump. Upon sensing that the output voltage of the charge pump is above a desired value, the output monitor may disable the charge pump circuit and may enable the shunt circuit to reduce the voltage at the output of the charge pump. When the voltage output of the charge pump is below the desired value, the output monitor may disable the shunt circuit and may enable the charge pump circuit.

In another embodiment similar to that described above, a shunt circuit having proportional control is substituted for the shunt circuit with on/off control. Upon sensing a deviation from a desired output value at the output of the charge pump, the output monitor provides a signal to the shunt circuit that is proportional to the deviation at the charge pump output. The effective resistance of the shunt is proportionally reduced in response to a positive deviation and proportionally increased in response to a negative deviation. Proportional control of the shunt circuit may be combined with on/off control of the charge pump circuit to regulate the output voltage.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

DESCRIPTION OF THE PREFERRED EMBODIMENTS

In the following detailed description of the present invention, a feedback-controlled body-bias circuit, numerous specific details are set forth in order to provide a thorough understanding of the present invention. However, it will be obvious to one skilled in the art that the present invention may be practiced without these specific details. In other instances well known methods, procedures, components, and circuit elements have not been described in detail as not to unnecessarily obscure aspects of the present invention.

Figure 2:
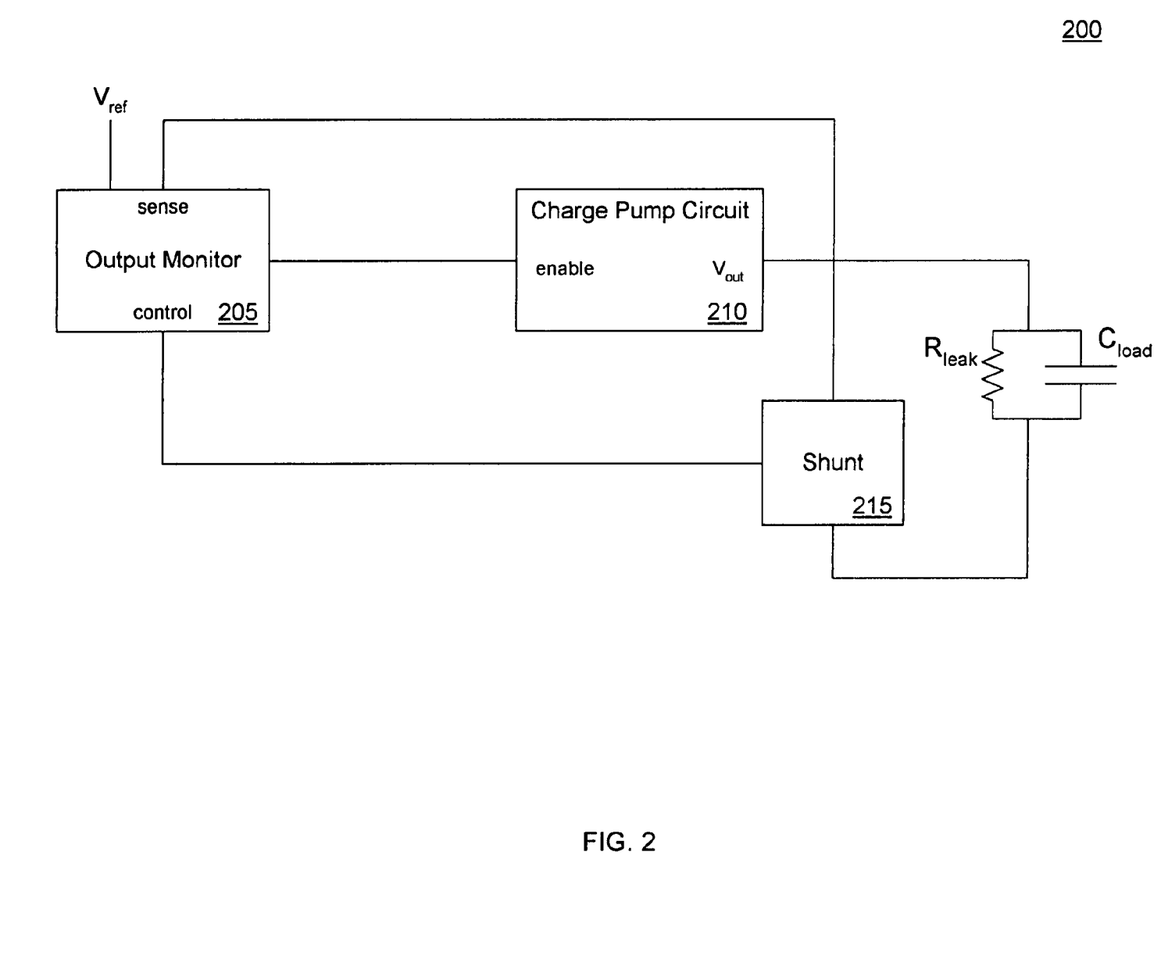
FIG. 2 shows a block diagram of a feedback controlled body-bias circuit in accordance with an embodiment of the present claimed invention.

FIG. 2 shows a block diagram 200 of an embodiment of the present invention. A charge pump 210 has an output coupled to $C_{load}$ that represents a substrate or well. Since body-bias is typically applied as a reverse bias to a p-n junction within a CMOS device, the load seen by the body-bias voltage source is generally a capacitive load; however, there is a certain amount of leakage current, represented by $R_{leak}$.

An output monitor 205 has a sense input coupled to the output of the charge pump 210. The output of the charge pump is compared to a reference voltage $V_{ref}$ by the output monitor 205. Upon sensing a positive or negative deviation (overvoltage or undervoltage) that exceeds an allowed value, the output monitor provides a control signal to the charge pump circuit 210 and/or a shunt circuit 215.

For an overvoltage condition with loads having a large $C_{load}$ and large $R_{leak}$ (small leakage current), simply turning off the charge pump may not result in a sufficiently fast discharge of $C_{load}$ to the desired value. Accordingly, the shunt 215 may be enabled to provide a discharge path that allows faster correction of the output voltage $V_{out}$.

Upon sensing an undervoltage condition, the output monitor 205 may enable the charge pump circuit 210 and/or disable the shunt circuit 215. In one embodiment, the charge pump is run continuously, with the shunt being cycled between enabled and disabled states to maintain the output voltage.

In determining the voltage deviation that is permitted in the system, a deadband having upper and lower control points may be used, or a single setpoint may be used (no allowable deviation).

In an alternative embodiment, the output monitor 205 provides a proportional signal to the shunt circuit 215 that is proportional instead of the on/off control described above. The effective resistance of the shunt is proportionally reduced in response to a positive deviation and proportionally increased in response to a negative deviation. Proportional control is preferably implemented using analog circuits, and thus is suitable for use in a mixed-signal integrated circuit.

Figure 3:
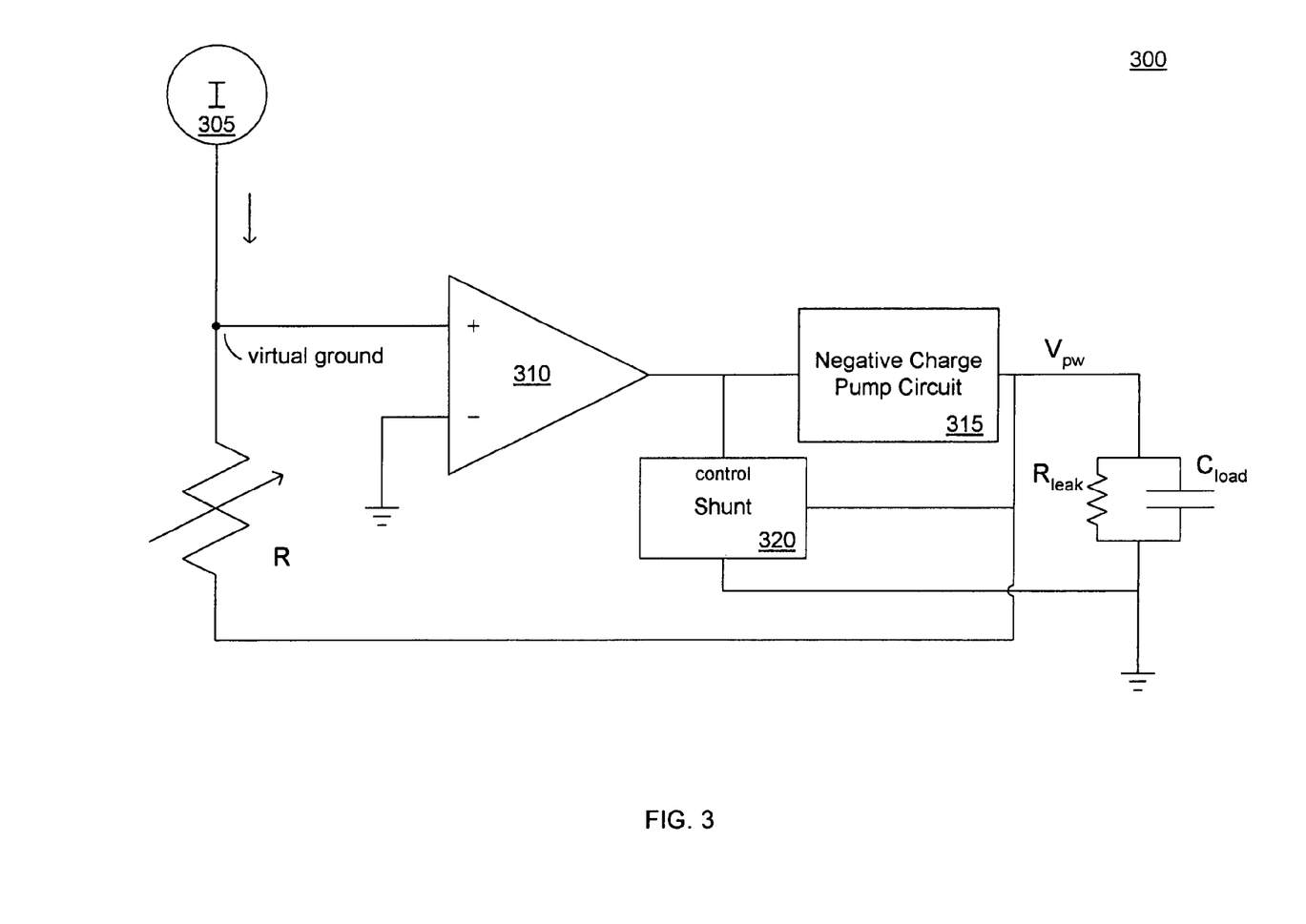
FIG. 3 shows a circuit diagram of a body-bias supply with a servo loop for NFETs in accordance with an embodiment of the present claimed invention.

FIG. 3 shows a circuit diagram 300 of a body-bias supply with a servo loop for NFETs in accordance with an embodiment of the present claimed invention. The current source 305 and variable resistor R combine to provide a reference voltage (e.g., $V_{ref}$ of FIG. 2). The comparator 310, shunt 320, and charge pump 315 correspond to the output monitor 205, shunt 215, and charge pump 210 of FIG. 2. The output of charge pump 315 is a negative voltage that may be used to bias a P-type substrate or well to provide a body-bias for NFETs.

Figure 4:
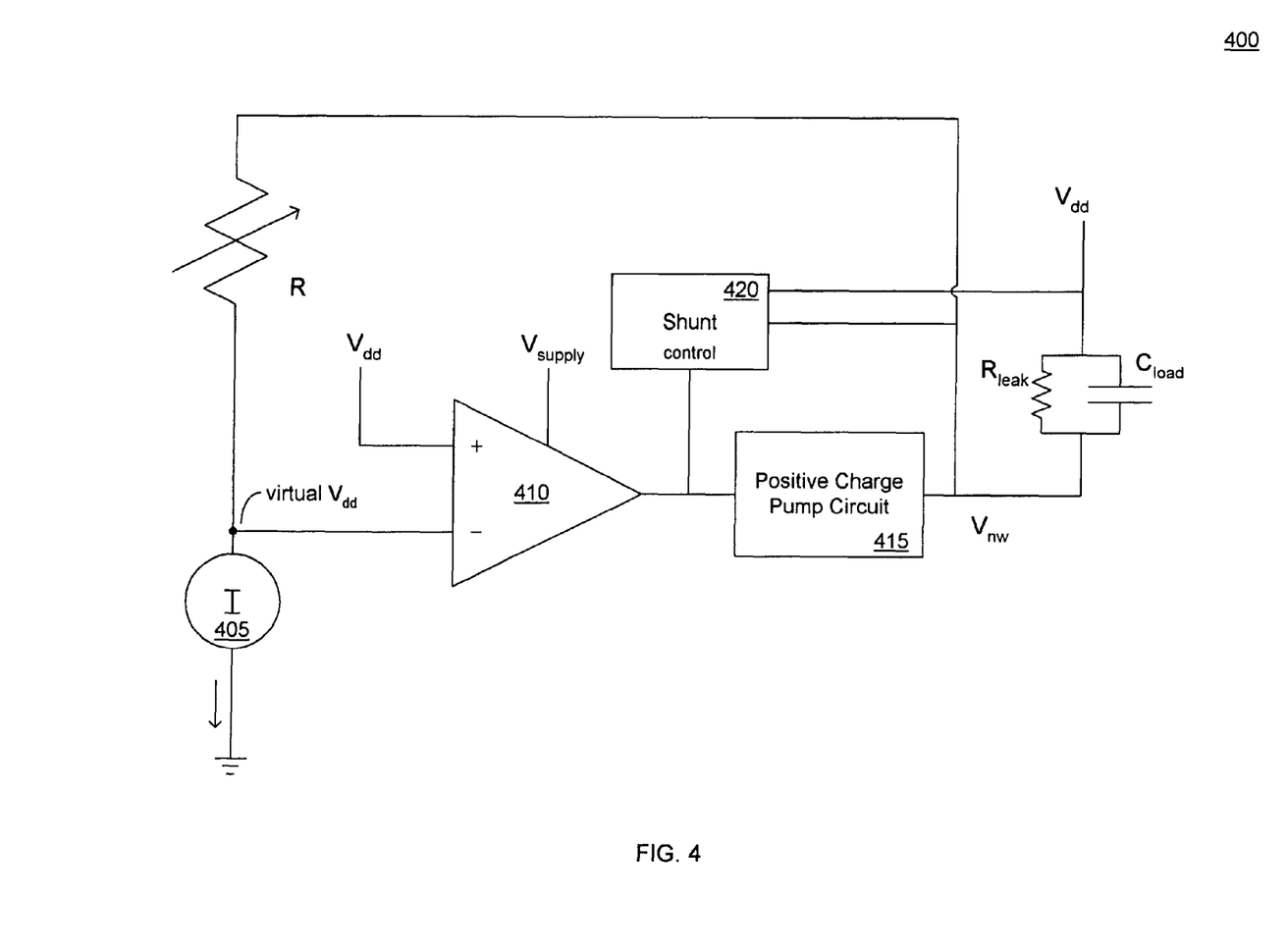
FIG. 4 shows a circuit diagram of a body-bias supply with a servo loop for PFETs in accordance with an embodiment of the present claimed invention.

FIG. 4 shows a circuit diagram 400 of a body-bias supply with a servo loop for PFETs in accordance with an embodiment of the present claimed invention. The current sink 405 and variable resistor R combine to provide a reference voltage (e.g., $V_{ref}$ of FIG. 2). The comparator 410, shunt 420, and charge pump 415 correspond to the output monitor 205, shunt 215, and charge pump 210 of FIG. 2. The output of charge pump 315 is a positive voltage that may be used to bias an N-type substrate or well to provide a body-bias for PFETs.

A description of the circuits shown in FIG. 3 and FIG. 4 is provided in the previously incorporated copending patent application entitled "Servo Loop for Well Bias Voltage Source" (U.S. Pat. No. 7,129,771). More specifically, descriptions of the variable resistor R and shunt (320, 420) shown in FIG. 3 and FIG. 4 are provided in the previously incorporated copending patent applications entitled "A Precise Control Component for a Substrate Potential Regulation Circuit" and "A Charge Stabilizing Component for a Substrate Potential Regulation Circuit" (U.S. Pat. No. 7,012,461).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. For example, an integrated circuit having a P-type substrate and an N-well disposed therein is described. More generally, the invention may be used with a semiconductor substrate of either N-type or P-type having a complementary well disposed therein. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

The invention claimed is:

1. A system comprising:
   first circuitry operable for generating an output voltage;
   second circuitry coupled to said first circuitry and operable for adjusting said output voltage in response to a control signal by providing a discharge path for said output voltage if enabled; and
   an output monitor coupled to said first circuitry and operable for comparing said output voltage and a reference voltage and operable for generating said control signal based on a result of said comparing, wherein said control signal has a state that is proportional to an amount of difference between said output voltage and said reference voltage, wherein said output monitor is further operable for enabling said first circuitry in response to sensing an undervoltage condition, and wherein further an amount of voltage discharged via said second circuitry is configured to be proportionally controlled according to said state of said control signal.

2. The system of claim 1 wherein said first circuitry comprises a charge pump.

3. The system of claim 1 wherein said second circuitry comprises a shunt circuit.

4. The system of claim 1 wherein an effective resistance of said second circuitry, if enabled, is configured to be proportionally controlled according to said state of said control signal.

5. The system of claim 1 wherein said output monitor is further operable for enabling said second circuitry to provide said discharge path for said output voltage in response to sensing an overvoltage condition.

6. The system of claim 1 wherein said output monitor is further operable for disabling said second circuitry in response to sensing said undervoltage condition.

7. The system of claim 1 wherein said output monitor is further operable for cycling said second circuitry between enabled and disabled states in response to sensing an undervoltage condition if said first circuitry is enabled.

8. The system of claim 1 wherein said first circuitry is coupled to a P-type well, and wherein said output voltage comprises a negative voltage usable as a body bias voltage to bias said P-type well.

9. The system of claim 1 wherein said first circuitry is coupled to an N-type well, and wherein said output voltage comprises a positive voltage usable as a body bias voltage to bias said N-type well.

10. The system of claim 1 further comprising a current source coupled to a variable resistor, wherein said current source and said variable resistor are operable for providing said reference voltage.

11. A device comprising:
a well disposed in a substrate;
first circuitry operable for generating a body bias voltage for biasing said well;
an output monitor coupled to said first circuitry and operable for comparing said body bias voltage and a reference voltage and operable for generating a control signal based on a result of said comparing, wherein said control signal is proportional to an amount of difference between said output voltage and said reference voltage; and
second circuitry coupled to said first circuitry and operable for adjusting said body bias voltage in response to said control signal, wherein said output monitor is further operable for enabling said first circuitry in response to sensing an undervoltage condition, and wherein further an amount of voltage discharged via said second circuitry is configured to be proportionally controlled according to said state of said control signal.

12. The device of claim 11 wherein said first circuitry comprises a charge pump and said second circuitry comprises a shunt circuit.

13. The device of claim 11 wherein said output monitor is further operable for enabling said second circuitry to provide a discharge path for said body bias voltage in response to sensing an overvoltage condition.

14. The device of claim 11 wherein said output monitor is further operable for disabling said second circuitry in response to sensing said undervoltage condition.

15. The device of claim 11 wherein said output monitor is further operable for cycling said second circuitry between an enabled state and a disabled state in response to sensing an undervoltage condition if said first circuitry is enabled, and wherein said second circuitry, if enabled, provides a discharge path for said body bias voltage.

16. A method comprising:
sensing a first voltage at an output monitor coupled to an integrated circuit;
sensing a reference second voltage at said output monitor;
generating a control signal based on a comparison of said first voltage and said second voltage, wherein said control signal has a state that is proportional to an amount of difference between said first voltage and said second voltage; and
adjusting said first voltage in response to said control signal via a discharge path that shunts said first voltage if enabled; and
enabling a source of said first voltage in response to sensing an undervoltage condition, and wherein further an amount of voltage discharged via said second circuitry is configured to be proportionally controlled according to said state of said control signal.

17. The method of claim 16 further comprising:
enabling said discharge path for said first voltage in response to sensing an overvoltage condition; and
varying an effective resistance of said discharge path according to said state of said control signal.

18. The method of claim 16 further comprising disabling said discharge path for said first voltage in response to sensing an undervoltage condition.

19. The method of claim 16 further comprising cycling said discharge path for said first voltage between an enabled state and a disabled state in response to sensing an undervoltage condition if a source of said first voltage is enabled, and wherein, in said enabled state, an effective resistance of said discharge path is varied according to said state of said control signal.

20. The method of claim 16 wherein said first voltage comprises a negative voltage usable as a body bias voltage to bias a P-type well of said integrated circuit.

21. The method of claim 16 wherein said first voltage comprises a positive voltage usable as a body bias voltage to bias an N-type well of said integrated circuit.

* * * * *

UNITED STATES PATENT AND TRADEMARK OFFICE
CERTIFICATE OF CORRECTION

PATENT NO.        : 8,436,675 B2
APPLICATION NO.   : 12/685452
DATED             : May 7, 2013
INVENTOR(S)       : Chen It is certified that error appears in the above-identified patent and that said Letters Patent is hereby corrected as shown below:

On the Title Page, Item (57), under "ABSTRACT", in Column 2, Line 2, delete "a shunt" and insert -- A shunt --, therefor.

On Title Page 4, Item (56), under "OTHER PUBLICATIONS", in Column 1, Line 8, delete "1736;," and insert -- 1736; --, therefor.

On Title Page 4, Item (56), under "OTHER PUBLICATIONS", in Column 2, Line 45, delete "DAvid E." and insert -- David E. --, therefor.

In the Specification

In Column 3, Line 13, delete "DESCRIPTION" and insert -- DETAILED DESCRIPTION --, therefor.

Signed and Sealed this
Sixth Day of May, 2014

Michelle K. Lee
*Deputy Director of the United States Patent and Trademark Office*